United States Patent [19]

Haisma et al.

[11] Patent Number: 4,731,558
[45] Date of Patent: Mar. 15, 1988

[54] METHOD OF REDUCING THE REFLECTANCE OF A TRANSPARENT VIEWING SCREEN AND VIEWING SCREEN WITH REDUCED REFLECTANCE

[75] Inventors: Jan Haisma; Johannes M. M. Pasmans; Pieter van der Werf; Albertus J. M. Rombouts, all of Eindhoven, Netherlands

[73] Assignee: U.S. Philips Corporation, New York, N.Y.

[21] Appl. No.: 926,820

[22] Filed: Nov. 3, 1986

Related U.S. Application Data

[63] Continuation of Ser. No. 628,708, Jul. 9, 1984, abandoned.

[30] Foreign Application Priority Data

Jul. 11, 1983 [NL] Netherlands ............... 8302460

[51] Int. Cl.⁴ .................. H01J 29/89; H01J 9/20
[52] U.S. Cl. .................... 313/478; 313/474; 313/116; 358/252
[58] Field of Search .............. 313/478, 474, 116; 358/250, 252; 427/299; 445/6; 313/479, 480, 466

[56] References Cited

U.S. PATENT DOCUMENTS

| | | | |
|---|---|---|---|
| 2,044,350 | 4/1934 | Edwards et al. | 445/6 |
| 2,612,611 | 9/1952 | Szego et al. | 313/478 |
| 3,504,212 | 3/1970 | Wollentin et al. | 313/478 |
| 4,410,310 | 10/1983 | Halbrook | 445/6 |

FOREIGN PATENT DOCUMENTS

| | | |
|---|---|---|
| 2321349 | 10/1974 | Fed. Rep. of Germany . |
| 0129873 | 10/1979 | Japan ............... 313/474 |

Primary Examiner—Leo H. Boudreau
Assistant Examiner—K. Wieder
Attorney, Agent, or Firm—Norman N. Spain

[57] ABSTRACT

A viewing screen is described, in particular the screen of a display tube, which has excellent anti-reflective properties and a method of making this screen anti-reflective. In this method the outer surface of the screen is mechanically roughened in conformity with specific requirements and subsequently an anti-reflective coating of constant thickness is applied to the roughened surface.

17 Claims, 11 Drawing Figures

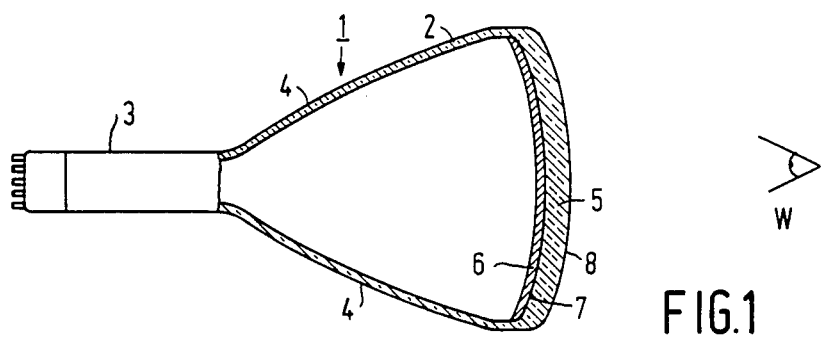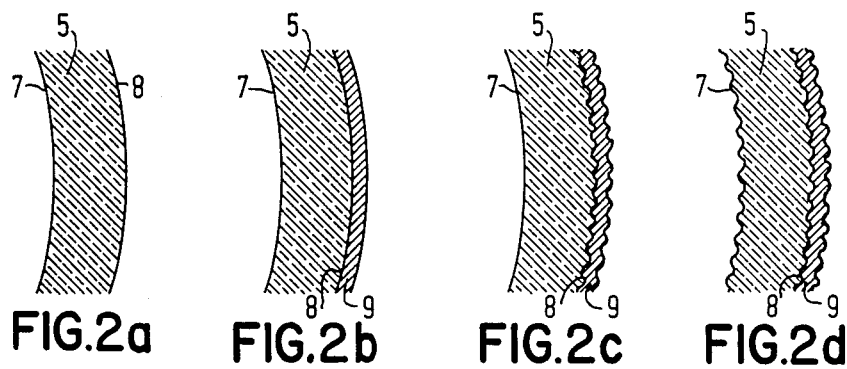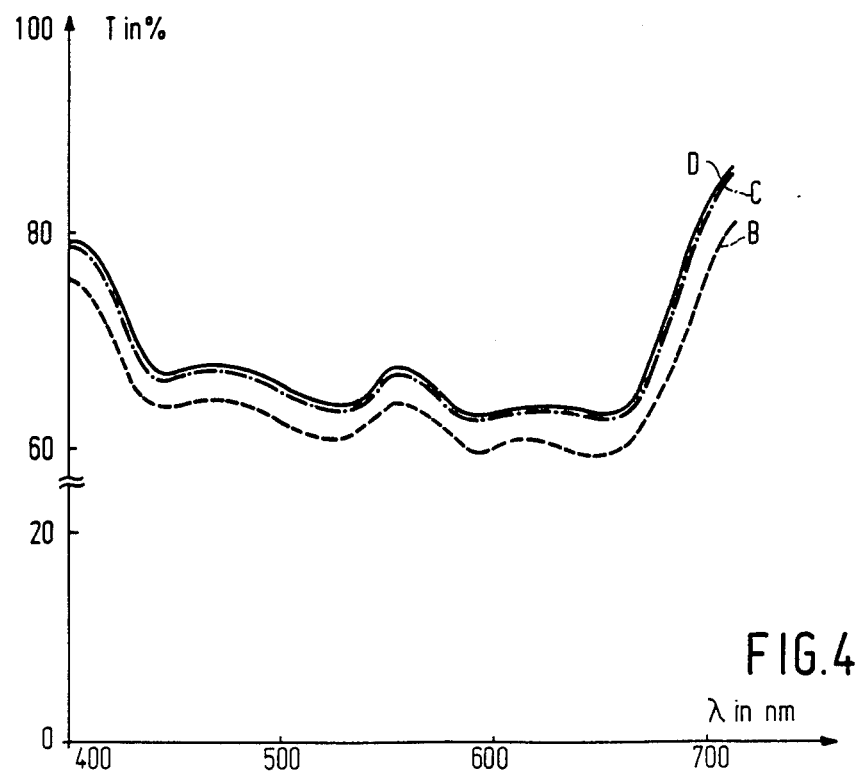

METHOD OF REDUCING THE REFLECTANCE OF A TRANSPARENT VIEWING SCREEN AND VIEWING SCREEN WITH REDUCED REFLECTANCE

This is a continuation of application Ser. No. 628,708, filed July 9, 1984, abandoned.

BACKGROUND OF THE INVENTION

The invention relates to a method of reducing the reflectance of a transparent viewing screen.

The invention also relates to a viewing screen with reduced reflectance, the outer surface of the screen being provided with an anti-reflective coating.

The viewing screen may be the screen of a cathode-ray tube, for example a television picture tube, but alternatively the screen of other display devices, such as a solid-state electroluminescent display device. The outer surface of the viewing screen is the side of the screen facing the viewer.

Display tubes and devices must be suitable for use under high-intensity ambient-light conditions. Since in practice the brightness of a picture on a display tube is limited, the contrast must be as high as possible, so that even in the case of high-intensity ambient-light levels a clearly visible picture is presented to the viewer.

U.S. Pat. No. 3,504,212 describes a method of improving the contrast of a television picture tube in which a light-absorbing and light-scattering layer is provided between the phosphor layer and the inner surface of the faceplate. This layer serves to ensure that the ambient light which is incident via the faceplate is no longer reflected to the viewer. Before the light-absorbing layer is deposited the inner surface of the faceplate is frosted or roughened. This is achieved by immersion of the faceplate in an etching bath. This inevitably leads to the outer surface of the faceplate also being roughened. The profile on the outer surface of the faceplate as a result of etching has radii which cause a substantial scattering of light and an impermissible reduction in sharpness or definition and contrast of the picture to be reproduced on the faceplate. In order to preclude this, a further process step is applied in which both faceplate surfaces are heated and polished, so as to obtain a satin-type finish. Finally, the satin-finish outer surface of the faceplate is provided with an anti-reflective coating of magnesium fluoride to reduce residual reflections.

In mass-production processes etching is not a highly favoured process step because it requires special working conditions and because of the storage of the aggressive etching acids. Moreover, an additional process step is required after etching. Also, an additional coating must be applied, so that the method described in U.S. Pat. No. 3,504,212 is rather cumbersome.

SUMMARY OF THE INVENTION

It is an object of the present invention to provide a method of reducing the reflectance of a viewing screen without the use of an etching process and with a minimal number of process steps. It is another object of the invention to provide a viewing screen which is not provided with an additional layer having scattering and absorbing properties but which exhibits a surprising combination of properties, namely: a significant reduction of the reflectance compared with a viewing screen which has not been subjected to an anti-reflection treatment; a negligible reduction of the transmittance to the light with which the picture is formed, and the absence of colour-shading as occurs in the low-reflectance screens known until now.

In accordance with a first aspect of the invention the method is characterized in that firstly the outer surface of the screen is mechanically roughened and subsequently the roughened outer surface is provided with an anti-reflective coating in such a manner that this coating has a constant thickness. From reasons already given it will be evident that mechanical roughening is advantageous compared with roughening by means of etching. Moreover, by means of the present method of roughening the exact surface roughness required for a specific light scattering can be obtained. The optimum surface finish required for scattering cannot be obtained by etching.

Preferably, the inner surface of the viewing screen is also roughened mechanically. This enables the inherently low residual reflectance caused by reflections from the inner surface of the viewing screen to be reduced even further.

Preferably, mechanical roughening is effected by using the technique of loose grains on a flexible polishing base.

Preferably, the method in accordance with the invention is characterized further in that the anti-reflective coating is formed by vapour-deposition or sputtering in a vacuum system. Thus, a coating of uniform thickness over the entire screen area can be obtained. In accordance with a further characteristic feature of the invention an outer coating of the viewing screen which is resistant to atmospheric influences and which is scratch and wiping resistant is obtained if on the roughened outer surface of the screen a layer of magnesium fluoride is vapour-deposited as anti-reflective coating, the vapour-deposition flow towards the outer surface being directed at an angle smaller than 15° to the normal to the outer surface.

It is to be noted that the article: "Wear resistance of Magnesium Fluoride Films on Glass" in the "Journal of the Optical Society of America", Vol. 46, no. 10, October 1956, pages 773-777 describes the step of vapour-deposition at an angle of 90° or an angle which deviates only slightly from this angle. However, in this article it is not suggested to effect vapour-deposition on a roughened surface. Since the surface finish of the layer which is vapour-deposited on said surface is vulnerable, hardening of this layer is particularly useful.

The method in accordance with the invention may be characterized further in that during vapour-deposition the outer surface of the viewing screen is brought to a temperature of approximately 300° C. This results in a very stable coating on the viewing screen.

Another version of the method in accordance with the invention is characterized in that before the vapour-deposition the outer surface of the screen is chemically activated by subjecting it to a glow-discharge for at least 15 minutes and during vapour-deposition this outer surface is maintained at room temperature. This again results in a very stable coating without the screen having to be heated.

If the viewing screen is a flat screen it may be weakened by roughening the outer surface. In accordance with a further characteristic feature of the invention this problem is precluded if prior to deposition of the anti-reflective coating the roughened outer surface is chemically treated so as to obtain an exchange of Na-glass ions with metal ions of a salt solution, thereby reinforcing the glass.

It is to be noted that reinforcing glass by means of an ion exchange process is described in the Applicants' Netherlands Patent Application no. 8100602 (PHN 9956). This process described in this Application is used for reinforcing a transparent mould.

In accordance with a second aspect of the invention a viewing screen whose outer surface is provided with an anti-reflective coating is characterized in that at least the outer surface of the viewing screen is mechanically roughened, the roughness parameters satisfying the following requirements:

25 nm $< R_a <$ 200 nm
50 nm $< R_q <$ 250 nm
250 nm $< R_{tm} <$ 1500 nm
25 $\mu$m $< S_m <$ 100 $\mu$m the anti-reflective coating on the roughened outer surface having a constant thickness and following the surface profile obtained after roughening.

The parameters $R_a$, $R_q$, $R_{tm}$ and $S_m$ are the well-known roughness parameters as specified in standards such as U.S.A.-ANSIB 46.1; U.K. BS 1134 or Netherlands NEN sheets 3631, 3632, 3634, 3637, 3638, which fully define the roughening. Elimination of reflection from the viewing screen in accordance with the invention is completely achieved by the combination of surface-roughening and an anti-reflective coating of constant thickness and not primarily by providing an additional coating as in the viewing screen in accordance with U.S. Pat. No. 3,504,212. It has been found that the roughening as has already been described in the specification provides an optimum scattering which in conjunction with the interferometric effect of the thin coating yields a maximum reduction of reflections over the entire range of wavelengths of visible light.

In order to reduce the comparatively small residual reflectance the viewing screen in accordance with the invention may be characterized further in that the inner surface of the viewing screen is also mechanically roughened.

A preferred embodiment of the invention is characterized further in that the anti-reflective coating comprises a single layer whose refractive index is smaller than that of the viewing-screen material and whose optical thickness is equal to a quarter of a reference wavelength for the range of wavelengths for which the reflectance must be reduced.

In this respect the term "optical thickness" is to be understood to mean the product of the geometrical thickness and the refractive index of the layer.

It has been found that an optimum reflectance reduction is achieved by means of an anti-reflective coating comprising a layer of magnesium-fluoride having a geometrical thickness of approximately 85 nm.

BRIEF DESCRIPTION OF THE DRAWING

In the drawing:

FIG. 1 schematically shows a television picture tube,

FIGS. 2a, 2b, 2c and 2d are cross-sectional views of a non-treated viewing screen, a viewing screen provided with an anti-reflective coating, and two viewing screens whose reflectance has been reduced in accordance with the invention, FIG. 4 shows the transmittance as a function of the wavelength for viewing screens treated in different manners.

DESCRIPTION OF THE PREFERRED EMBODIMENTS

Figure 3:
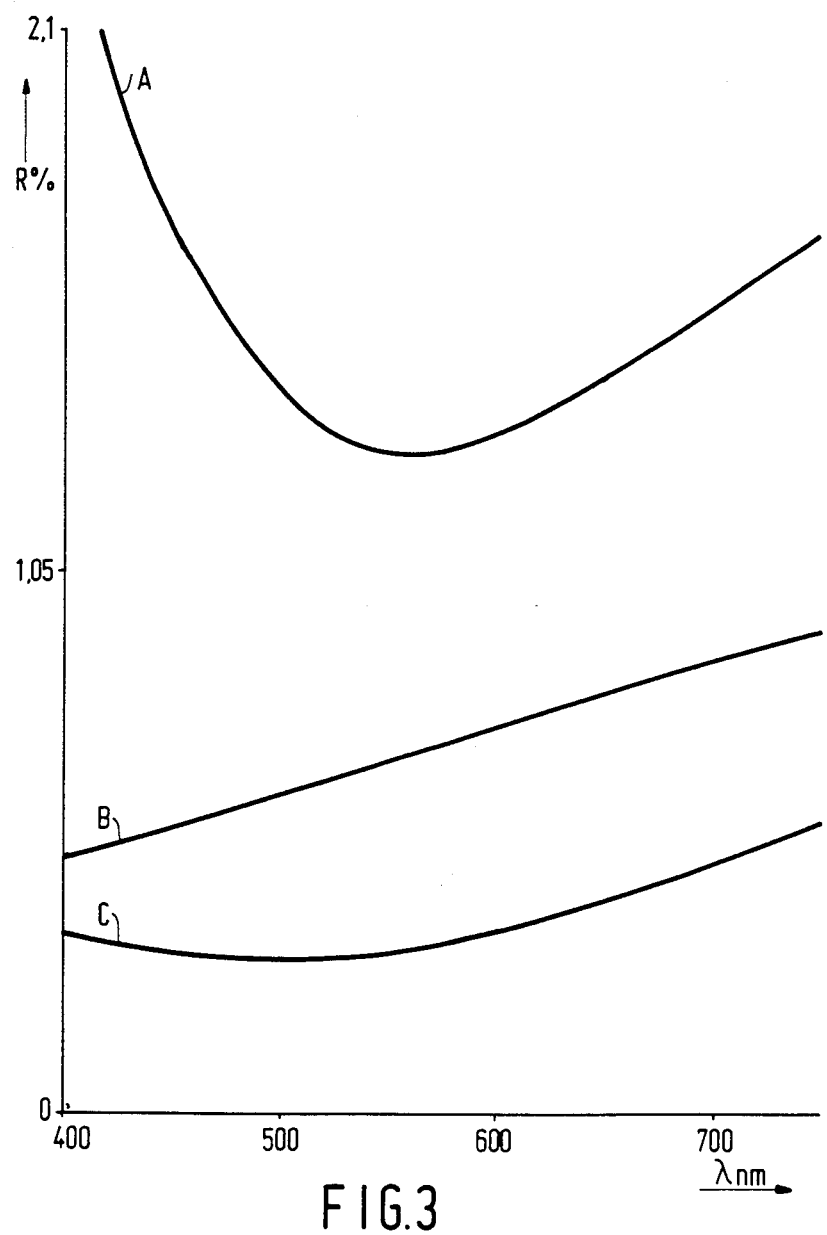
FIG. 3 shows the reflectance as a function of the wavelength for viewing screens treated in different manners.

The invention will now be described in greater detail by describing its use in a television picture tube and by reference to the drawing.

FIG. 1 shows a cathode-ray tube 1 comprising an envelope 2 which comprises a neck portion 3, a flare portion 4 and a faceplate or viewing-screen portion 5. The neck portion 3 contains an electron gun, not shown, which emits electrons towards the screen. These electrons impinge on a fluorescent layer 6 provided on the inner surface 7 of the viewing screen. The visible light emitted by the fluorescent layer when an electron beam is incident on this layer is transmitted by the screen 5 and forms a picture which can be observed by a viewer W situated to the right of the outer surface 8 of the screen.

FIGS. 2a, 2b, 2c and 2d show different versions of the viewing screen in cross-section. FIG. 2a shows an "untreated" picture screen which has not been subjected to any anti-reflection treatment. This screen is made of glass having a refractive index $n_g$ of, for example, 1.52, so that in the glass-air transition, i.e. on the outer surface 8 of the screen, a refractive index step $\Delta n = n_g - n_l = 0.52$ occurs. This viewing screen has a reflectance of, for example, 4.2%. FIG. 2b shows a part of a viewing screen which is made anti-reflective by providing the outer surface 8 with a coating 9 which has a refractive index $n_c$ which is smaller than that of the glass. This coating is made of, for example, magnesium-fluoride with a refractive index $n_c = 1.38$ and an optical thickness of preferably $\frac{1}{4}\lambda_o$, $\lambda_o$ being a reference wavelength for the range of wavelengths for which the reflectance must be reduced. In this screen two refractive-index steps occur, namely a first step at the outer surface of the screen, for which $\Delta n_1 = n_g - n_c$ is for example 0.14, and a second step at the outer surface of the anti-reflective coating for which $\Delta n_2 = n_c - n_1$ is for example 0.38. The reflectance of a viewing screen coated with a layer of magnesium-fluoride is smaller than that of an uncoated screen but is still approximately 1.5%. As is apparent from curve A in FIG. 3 which curve represents the reflectance as a function of the wavelength $\lambda$ for glass having a refractive index $n_g = 1.52$, the reflectance is moreover highly wavelength-dependent so that the picture being reproduced exhibits colour shading. Apart from the fact that the colour in this picture is unnatural it may also change depending on the angle at which the screen is viewed.

In accordance with the invention the reflectance can be reduced to a value well below the afore-mentioned 1.5% and can also be rendered less wavelength-dependent, which substantially reduces colour shading. All this can be achieved without an excessive reduction of the transmittance for the light produced by the fluorescent layer and the definition or resolving power of the picture.

Figure 5A:
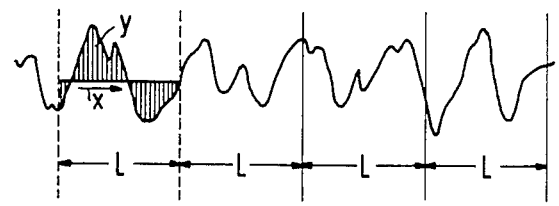
FIGS. 5a, 5b and 5c represent the roughness profiles used for defining the roughness parameters.
Figure 5B:
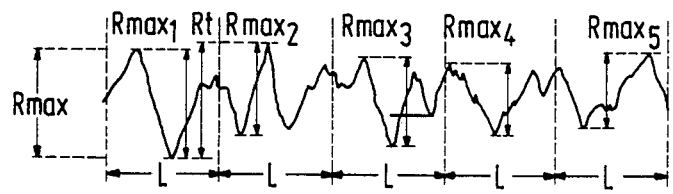
Figure 5C:

For this purpose, as is shown in FIG. 2c, the outer surface of the screen is firstly roughened in a specific manner and subsequently an anti-reflective coating 9 is deposited on the roughened outer surface, for example by vapour-deposition. The surface profile is obtained mechanically, for example by treating the outer surface with silicon-carbide grains on a flexible polishing base. Roughening must be effected in such a manner that the resulting surface profile satisfies specific requirements. Preferably these requirements are defined by means of the known roughness parameters as specified in standards such as U.S.A. ANSIB 46.1 or U.K. Bs 1134. For completeness FIGS. 5a, 5b and 5c show how the relevant roughness parameters $R_a$, $R_q$, $R_{tm}$ and $S_m$ are defined. The parameters $R_a$ and $R_q$, $R_{tm}$ and $S_m$ are defined with reference to FIGS. 5a, 5b and 5c respectively, and are given by:

$$R_a = \frac{1}{L} \int_0^L |y(x)| dx$$

$$R_q = \sqrt{\frac{1}{L} \int_0^L y^2(x) dx}$$

$$R_{tm} = \frac{R_{max_1} + R_{max_2} + R_{max_3} + R_{max_4} + R_{max_5}}{5} = \frac{1}{5} \sum_{i=1}^{5} R_{max_i}$$

$$S_m = \frac{S_1 + S_2 + S_3 + \ldots + S_n}{n} = \frac{1}{n} \sum_{i=1}^{n} S_i$$

The level $l_m$ has been selected in such a manner that of the total area between the roughness curve and the line $l_m$ the part above the level $l_m$ is equal to the part below $l_m$. For the roughness profile in accordance with the invention the sampling length L (FIGS. 5a and 5b) is approximately 0.8 mm.

Figure 6:
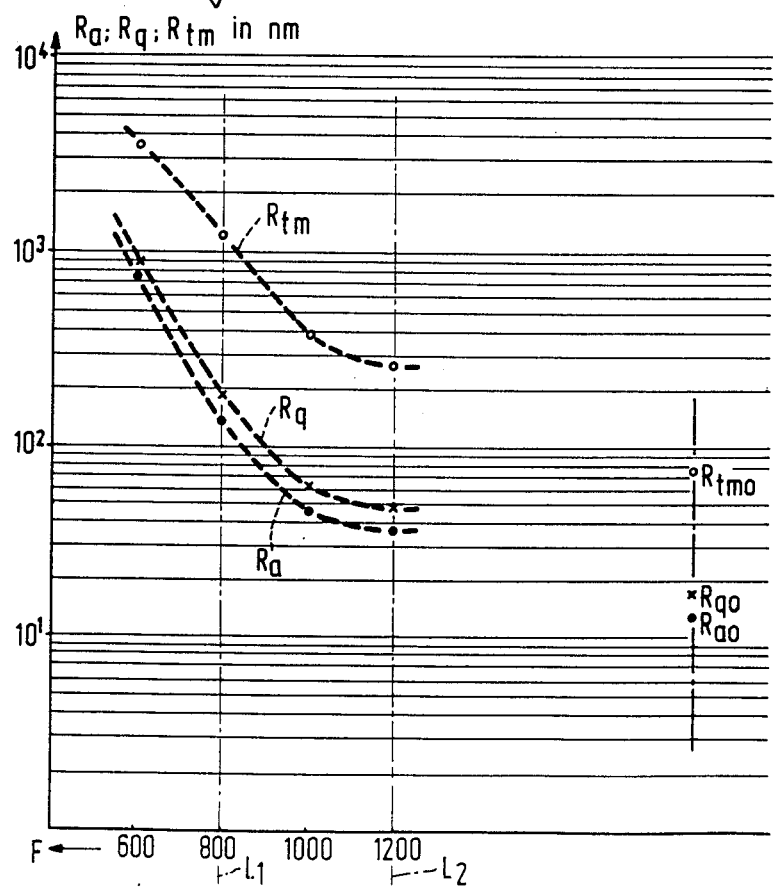
FIG. 6 shows the roughness parameters as a function of the grain size of the grains used for roughening.

The roughness of the outer surface of the viewing screen depends on the size of the grains used for roughening. The "Fachverband Elektrokorund und Silizium-karbid Hersteller E.V.", "F.E.P.A.", have defined a series of micrograins whose sizes range between 3 μm and 53 μm in accordance with the so-called F-series, as laid down in the "FEPA Mikrogrössen Standard für Schleifmittelkorn" (1965). This series ranges from F 230/50 with a grain size of 53.0±3.0 μm up to F 1200/3 with a grain size of 3±0.5 μm. FIG. 6 illustrates the variation of the parameters $R_a$, $R_q$, $R_{tm}$ as a function of the grain size F thus defined on a logarithmic scale. For comparison the parameters of non-roughened highly polished television glass, $R_{a,o}$, $R_{q,o}$ and $R_{tm,o}$ are given in the left-hand part of FIG. 6. The roughness parameters for the outer surface of the viewing screen must satisfy the following requirements:

25 mm < $R_a$ < 200 nm
50 nm < $R_q$ < 250 nm
250 nm < $R_{tm}$ < 1500 nm
25 μm < $S_m$ < 100 μm

In FIG. 6 this means that the range of reflectance reduction obtained by roughening is situated between the vertical lines $L_1$ and $L_2$ i.e. for roughening use is made of grains with a grain size between F800/7 and F1200/3.

The reflectance reduction obtained if the viewing screen is roughened by abrasion with F1200/3 grains is indicated by the curve B in FIG. 3. This curve shows that the reflectance has been reduced substantially, whilst the reflectance as a function of the wavelength varies linearly.

If the roughened outer surface of the viewing screen is provided with a layer of magnesium-fluoride the reflectance varies in accordance with the curve C shown in FIG. 3. The reflectance is now reduced to a low level: over the entire range of relevant wavelengths the reflectance R does not exceed 0.5%, whilst for a specific wavelength R it is even 0.3%. Moreover, the wave-length-dependence is reduced substantially: the curve C is substantially flatter than the curve A. Moreover, as is illustrated by the curve B, the scattering of light is substantially stronger for smaller wavelengths, the blue portion of the light spectrum, than for the higher wavelengths, the red portion of the light spectrum, so that the total reflectance becomes more insensitive to colour and colour shading is almost eliminated, no colour change being perceptible when the angle at which the viewer looks at the picture is varied.

Finally, it is important that the transmittance of the viewing screen is not reduced significantly due to the steps taken, as can be seen in FIG. 4. This Figure shows the transmittance as a function of the wavelength for viewing screens treated in different manners. Curve D applies to a non-roughened viewing screen without anti-reflective coating. This screen has a transmittance of the order of 65%. In the case of roughening with SiC grains F1000/5 the transmittance T of the screen decreases to a value which is of the order of 4% smaller, as illustrated by curve B. If a layer of magnesium-fluoride is deposited on the roughened screen the transmittance surprisingly increases, so that the screen in accordance with the invention has an acceptable transmittance (curve C) which is substantially equal to that of a non-treated screen. For the sake of clarity curve C is shown slightly below curve D. In reality these curves practically coincide.

Ambient light is scattered and reflected at two locations by the viewing screen in accordance with the invention, namely at the transition from air to the coating 9 and at the transition from the coating 9 to the screen glass. For the small thickness of the coating 9 the ambient light behaves as coherent light. The ambient light reflected at the transition from air to the coating 9 is reflected in phase opposition to the ambient light reflected at the transition from the coating 9 to the screen glass. Thus, the light which is reflected and scattered towards the viewer may be eliminated by descructive interference.

The principal conclusion is that the overall result of roughening and providing an anti-reflective coating is better than the sum of the results of the two steps applied individually.

In a practical embodiment of a viewing screen in accordance with the invention the geometrical thickness of the magnesium-fluoride coating 9 for which $n_c = 1.38$ is approximately 85 nm, so that this screen has a maximum anti-reflective effect for a wavelength $\lambda_o = 480$ nm.

Some reflection may occur at the inner surface of the screen, i.e. at the transition from the glass to the fluorescent layer. This reflection may be reduced by mechanically roughening this inner surface. FIG. 2d shows a small part of such a viewing screen in a cross-sectional view.

Specifically, if the viewing screen is flat instead of curved as in FIG. 1, the glass may be weakened as a result of roughening. In order to compensate for this, the glass may be reinforced chemically before the anti-reflective coating is applied. For this purpose the roughened surface may be brought into contact with a salt solution. This enables an exchange of $Na^+$ ions of the glass with metal ions, specifically $K^+$ ions, of the solution. The screen thus treated has an edge portion on the outer surface which is under stress, which portion via a neutral stress-free zone changes into an area under tensile stress. This results in a substantial reinforcement of the glass. For further details about this chemical reinforcement technology reference is made to Netherlands Patent Application no. 8100602 (PHN 9956) in which a reinforced glass mould is described.

It is desirable that the outer surface of the picture screen, i.e. the top coating, is scratch and wiping resistant, i.e. hard, and also moisture proof. However, magnesium-fluoride is somewhat sensitive to moisture and a layer of this material which has been vapour-deposited in the customary manner is not very hard. In normal vapour-deposition of anorganic substances the vapour-deposition flow is directed at an acute angle with the surface to which the layer is to be applied. However, if magnesium-fluoride is vapour-deposited at an angle of 90° or an angle which deviates only slightly therefrom, a hard top-coating is obtained which is highly moisture-proof.

This vapour-deposition may be applied both to a hot viewing screen, i.e. one heated to approximately 300° C., and to a cold viewing screen, which is at room temperature. A layer of magnesium-fluoride which has been vapour-deposited on a hot screen has slightly better properties than the same layer deposited on a cold viewing screen. However, vapour deposition on a cold screen is advantageous from the point of view of manufacturing technology.

In the case of vapour-deposition on a cold viewing screen the roughened outer surface of the viewing screen is subjected to a glow-discharge in, for example argon, gas for at least 15 minutes prior to vapour-deposition, so that the screen is chemically activated to ensure a correct adhesion between the screen and the coating 9. A hot screen is already activated in the intended sense and requires no additional treatment prior to vapour-deposition.

The invention has been described for a television picture tube but may also be applied to other display systems using a transmissive viewing screen in which the picture to be displayed is situated close to the viewing screen.

What is claimed is:

1. A method of reducing the reflectance of a transparent viewing screen comprising first mechanically roughening the outer surface of the screen until the roughness parameters of the resultant roughened outer surface satisfies the following requirements $25 \text{ nm} < R_a < 200 \text{ nm}$
   $50 \text{ nm} < R_q < 250 \text{ nm}$
   $25 \text{ nm} < R_{tm} < 1500 \text{ nm}$
   $25 \text{ μm} < S_m < 100 \text{ μm}$ wherein
   $R_a$ is the arithmetic average of the absolute difference between the surface profile and the average surface level measured along a line,
   $R_q$ is the square root of the average difference squared between the surface profile and the average surface level measured along a line,
   $R_{tm}$ is the peak-to-valley height difference of the surface profile averaged over a number of line intervals, and
   $S_m$ is the average distance between positive crossings of the surface profile and the average surface level measured along a line and
then providing an anti-reflective coating on the roughened outer surface in such a manner that the thickness of the resultant coating is constant.

2. A method as claimed in claim 1, characterized in that the inner surface of the viewing screen is also roughened mechanically.

3. A method as claimed in claim 2, characterized in that the roughening is effected by means of loose grains on a flexible polishing base.

4. A method as claimed in claim 3, characterized in that the anti-reflective coating is formed by vapour-deposition or sputtering in a vacuum system.

5. A method as claimed in claim 4, characterized in that on the roughened outer surface of the screen a layer of magnesium-fluoride is vapour-deposited as anti-reflective coating, the vapour-deposition flow towards said outer surface being directed at an angle smaller than 15° to the normal to said outer surface.

6. A method as claimed in claim 5, characterized in that during vapour-deposition the outer surface of the viewing screen is brought at a temperature of approximately 300° C.

7. A method as claimed in claim 5, characterized in that prior to vapour-deposition the outer surface of the screen is chemically activated by subjecting it to a glow-discharge for at least 15 minutes and during vapour-deposition this outer surface is maintained at room temperature.

8. A viewing screen whose outer surface is provided with an anti-reflective coating, characterized in that at least the outer surface of the viewing screen is mechanically roughened, the roughness parameters satisfying the following requirements:

25 nm > $R_a$ > 200 nm
50 nm < $R_q$ < 250 nm
250 nm < $R_{tm}$ < 1500 nm
25 $\mu$m < $S_m$ < 100 $\mu$m wherein $R_a$ is the arithmetic average of the absolute difference between the surface profile and the average surface level measured along a line, $R_q$ is the square root of the average difference squared between the surface profile and the average surface level measured along a line, $R_{tm}$ is the peak-to-valley height difference of the surface profile averaged over a number of line intervals, and $S_m$ is the average distance between positive crossings of the surface profile and the average surface level measured along a line the anti-reflective coating on the roughened outer surface having a constant thickness and following the surface profile after roughening.

9. A viewing screen as claimed in claim 8, characterized in that the inner surface of the screen is also mechanically roughened.

10. A picture screen as claimed in claim 8, characterized in that the anti-reflective coating comprises a single layer whose refractive index is smaller than that of the viewing-screen material and whose optical thickness is equal to a quarter of a reference wavelength for the range of wavelengths for which the reflectance must be reduced.

11. A television picture tube provided with a viewing screen as claimed in claim 8.

12. A method as claimed in claim 2, characterized in that the roughening is effected by means of loose grains on a flexible polishing base.

13. A method as claimed in claim 2, characterized in that the anti-reflective coating is formed by vapour-deposition or sputtering in a vacuum system.

14. A method as claimed in claim 4, characterized in that the roughening is effected by means of loose grains on a flexible polishing base.

15. A picture screen as claimed in claim 9, characterized in that the anti-reflective coating comprises a single layer whose refractive index is smaller than that of the viewing-screen material and whose optical thickness is equal to a quarter of a reference wavelength for the range of wavelengths for which the reflectance must be reduced.

16. A television picture tube provided with a viewing screen as claimed in claim 9.

17. A television picture tube provided with a viewing screen as claimed in claim 10.

* * * * *